(12) United States Patent
Choi et al.

(10) Patent No.: US 10,200,578 B2
(45) Date of Patent: Feb. 5, 2019

(54) CAMERA DEVICE AND ELECTRONIC DEVICE WITH THE SAME

(71) Applicant: Samsung Electronics Co., Ltd., Gyeonggi-do (KR)

(72) Inventors: Yong-Hwan Choi, Gyeonggi-do (KR); Seung-Pil Youm, Gyeongsangbuk-do (KR); Ho-Jae Byon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 325 days.

(21) Appl. No.: 15/044,811

(22) Filed: Feb. 16, 2016

(65) Prior Publication Data
US 2016/0241750 A1 Aug. 18, 2016

(30) Foreign Application Priority Data
Feb. 16, 2015 (KR) ........................ 10-2015-0023646

(51) Int. Cl.
*H04N 5/225* (2006.01)
(52) U.S. Cl.
CPC ................................ *H04N 5/2252* (2013.01)
(58) Field of Classification Search
CPC ...... G02B 7/16; H04N 5/374–5/37457; H04N 5/335–5/378; H01L 27/14643–27/14663
USPC .................. 348/340, 373–375, 45, 294–324; 349/200; 250/208.1
See application file for complete search history.

(56) References Cited

U.S. PATENT DOCUMENTS

| 2005/0212947 A1* | 9/2005 | Sato ..................... H04N 5/2254 348/340 |
| 2006/0030381 A1* | 2/2006 | Byun .................. H04M 1/0237 455/575.4 |
| 2007/0212061 A1* | 9/2007 | Woo ....................... G03B 17/00 396/529 |
| 2011/0051390 A1* | 3/2011 | Lin ................... H01L 27/14618 361/818 |
| 2014/0036218 A1* | 2/2014 | Yu ........................ H04N 5/2257 349/200 |

FOREIGN PATENT DOCUMENTS

| KR | 101289178 | 7/2013 |
| WO | WO 2013187620 | 12/2013 |

* cited by examiner

*Primary Examiner* — Xi Wang
(74) *Attorney, Agent, or Firm* — The Farrell Law Firm, P.C.

(57) ABSTRACT

An electronic device is provide, and may include a first cover forming a first surface of the electronic device, a second cover forming a second surface of the electronic device, the second surface being positioned opposite the first surface, and a camera assembly at least partially disposed in a space between the first cover and the second cover, wherein the camera assembly may include an image sensor, a board having the image sensor mounted thereon and including at least one cut around the image sensor, a lens assembly disposed adjacent to a light-receiving surface of the image sensor, a side wall surrounding at least a portion of the lens assembly and having a protrusion fitted in the at least one cut, and at least one solid body provided between at least a portion of an inner surface of the at least one cut and the protrusion.

31 Claims, 9 Drawing Sheets

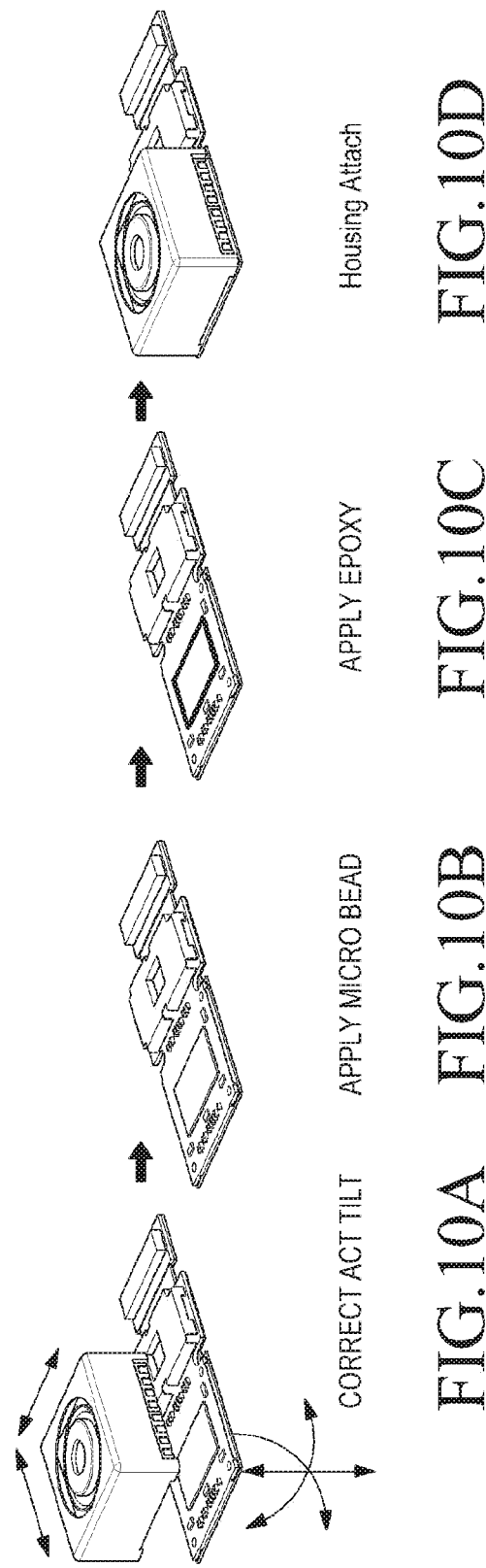

CAMERA DEVICE AND ELECTRONIC DEVICE WITH THE SAME

PRIORITY

This application claims priority under 35 U.S.C. § 119(a) to Korean Patent Application Serial No. 10-2015-0023646, which was filed in the Korean Intellectual Property Office on Feb. 16, 2015, the entire content of which is incorporated herein by reference.

BACKGROUND

1. Field of the Disclosure

Embodiments of the present disclosure generally relates to the assembly of camera devices within electronic devices and more particularly, to preventing misalignment of the camera devices with the electronic devices when performing assembly processes on the camera devices.

2. Description of the Related Art

Portable electronic devices may allow users to enjoy various content while carrying the devices. Examples of such portable electronic devices include portable terminals, MP3 players, or portable media players (PMPs). Such portable electronic devices are increasing the level of functionality while decreasing the dimensions of the device in accordance with customers' demand.

Portable electronic devices tend to have more diversified functions to meet customers' needs due to their portable nature. Advancing technology allows portable electronic devices to be used as a multi-media player that may function not only as a phone but also as a music player, a video player, a TV, or a game player. Camera devices play a major role in increasing the functionality of the portable electronic devices.

Such camera devices are evolving to have more pixels and more functions including autofocus (AF) or optical zoom.

Camera devices such as compact camera module (CCM), which are commonly small and compact, have various applications, such as mobile phones, personal digital assistants (PDAs), smartphones, or other mobile devices or various information technology (IT) devices, such as toy cameras. To meet the increasing needs of customers, more types of devices are available with a small camera device.

A major part of a camera device is a semiconductor chip (also referred to as an image sensor) which may be implemented as a charge coupled device (CCD) or complementary metal oxide semiconductor (CMOS) image sensor (CIS). An image of an object may be sensed by the image sensor and stored as data in the memory of the device. The stored data may be displayed as an image through a display panel or other display of the device.

The image sensor may be mounted on a board, e.g., a printed circuit board (PCB) or ceramic board (hereinafter, collectively referred to as a "printed circuit board"), and a cylindrical lens body with a lens may be assembled onto the printed circuit board.

A general structure and an assembly process of a camera device is described below.

The camera device includes a lower module of an image sensor module and an upper module of a lens assembly module that are assembled by separate processes and are then assembled together.

First, the process performed on the lower module of the camera device is described. The lower module of the camera device may include an image sensor and a printed circuit board. Assembly of the image sensor module may be performed via wire bonding or flip chip bonding. In the wire bonding method, the image sensor module may be formed by mounting the image sensor on the printed circuit board by way of a coupling method, such as die bonding. The image sensor mounted on the printed circuit board may be bonded to the printed circuit board using electrical signal lines such as wires or bond pads to electrically connect the image sensor with the printed circuit board (hereinafter, referred to as "wire bonding"), thereby forming the lower module of the camera device.

In the flip chip bonding method, the image sensor module may be assembled by electrically connecting the image sensor to the printed circuit board by directly soldering the solder bumps on the image sensor module to the printed circuit board.

Next, the assembly process performed on the upper module of the camera device is described. The upper module of the camera device may include a lens assembly, a cover glass or infrared (IR) filter (hereinafter, collectively referred to as an IR filter), and a side wall having the same. On the side wall may be mounted a lens assembly including at least one or more lens modules and a correction member that drives the lens module and performs image correction using at least one of automatic driving or manual driving of the lens, thereby forming the upper module. The upper module of the camera device may be joined with the lower module via heat-curing bonding.

Further, the IR filter may be mounted on a lower portion of the side wall or an upper portion of the image sensor module through an adhesive such as epoxy resin.

After the assembly of the image sensor module, the process of aligning the image sensor along the optical axis proceeds and after the upper module is assembled onto the lower module, the lens assembly and the image sensor are aligned to the optical axis.

To place the image sensor and the lens in the same optical focus, the image sensor and the lens need to be aligned while the optical axis is adjusted.

The lower image sensor module, however, may be mounted misaligned on the surface of the printed circuit board due to an uneven mounting surface or the printed circuit board may be misaligned upon assembly of the image sensor and the printed circuit board. As a result, the image sensor and the lens may be misaligned resulting in a misaligned optical axis.

When the image sensor is misaligned, the axis of light coming in may be misaligned, causing a deterioration in product quality of the camera device.

Further, such optical axis misalignment may also happen while the upper module is assembled on the lower module. In other words, in case the side wall has the lens assembly, the lens assembly, after completion of alignment, may be joined with the side wall via an adhesive, such as epoxy resin. In this process, the position of the lens assembly mounted inside the side wall is adjusted. A separate member is required to allow such adjustment to be done from outside the side wall. Further, in order to adjust the lens assembly from inside the side wall, a space is required between the lens assembly and the side wall causing the dimensions of the camera device to increase.

During the above-mentioned process of assembling the camera device, specifically, when mounting the image sensor on the printed circuit board, mounting the lens assembly on the side wall, and mounting and fastening the lens assembly-mounted side wall onto the image sensor module, tilts or other failures may occur due to dimensional tolerances or lack of assembly accuracy leading to a deteriorated resolution of the image quality.

Further, high-resolution camera devices require a higher level of alignment in optical axis between the lens and the sensor as compared with low-resolution camera devices and thus a higher resolution requires a higher assembly accuracy that may result in higher costs in development and production.

Thus, there is a need for a tilt correcting method for camera devices, which may reduce defects by minimizing tilts of the image sensor and lens assembly when assembling a high-resolution camera device and thus enables easier assembly development and savings in production costs.

SUMMARY

The present disclosure has been made to address at least the above mentioned disadvantages and problems, and to provide at least the advantages described below.

According to an embodiment of the present disclosure, an electronic device having a camera device are provided. In the camera device, the image sensor may be optically misaligned due to a surface imbalance in the printed circuit board or the lens assembly while processing the assembly of the side wall and lens assembly. The resulting tilt between the lower module and the upper module may be corrected upon assembly, and the optical axis may be aligned.

According to an aspect of the present disclosure, an electronic device having a camera device are provided. When a third module with a separate lens assembly is seated and tilted on the second module of the camera device, the third module may be corrected to be aligned with the optical axis of the second module.

In accordance with an aspect of the present disclosure, an electronic device includes a first cover forming a first surface of the electronic device, a second cover forming a second surface of the electronic device, the second surface being positioned opposite the first surface, and a camera assembly at least partially disposed in a space between the first cover and the second cover, wherein the camera assembly may include an image sensor, a board having the image sensor mounted thereon and including at least one cut around the image sensor, a lens assembly disposed adjacent to a light-receiving surface of the image sensor, a side wall surrounding at least a portion of the lens assembly and having a protrusion fitted in the cut, and at least one solid body provided between at least a portion of an inner surface of the cut and the protrusion.

In accordance with another aspect of the present disclosure, an electronic device includes a first cover forming a first surface of the electronic device, a second cover forming a second surface of the electronic device, the second surface being positioned opposite the first surface, and a camera assembly at least partially disposed in a space between the first cover and the second cover, wherein the camera assembly may include an image sensor, a board where the image sensor is mounted, a first lens assembly disposed adjacent to a light-receiving surface of the image sensor, a first side wall surrounding at least a portion of the first lens assembly and including at least one cut in a top surface thereof, a second lens assembly disposed adjacent to a light-receiving surface of the first lens assembly, a second side wall surrounding at least a portion of the second lens assembly and having a protrusion fitted in the cut, and at least one solid body provided between at least a portion of an inner surface of the cut and the protrusion.

In accordance with another aspect of the present disclosure, a camera device includes a board having an image sensor mounted thereon and including at least one cut around the image sensor, a side wall mounted on the board, having a lens assembly mounted thereon, and including a protrusion fitted in the cut, the lens assembly disposed adjacent to a light-receiving surface of the image sensor, and at least one solid body provided between at least a portion of an inner surface of the cut and the protrusion, wherein the at least one solid body includes solid bodies allowing the side wall mounted around the lens assembly to have different heights.

In accordance with another aspect of the present disclosure, a camera device includes a board having an image sensor mounted thereon and including at least one cut around the image sensor, a first side wall mounted on the board, having a first lens assembly mounted thereon, and including at least one cut formed in a top surface thereof, the first lens assembly disposed adjacent to a light-receiving surface of the image sensor, a second lens assembly disposed adjacent to a light-receiving surface of the first lens assembly, a second side wall surrounding at least a portion of the second lens assembly and having a protrusion fitted in the cut, and at least one solid body provided between at least a portion of an inner surface of the cut and the protrusion.

BRIEF DESCRIPTION OF THE DRAWINGS

The above and other aspects, advantages, and features of the present disclosure will become apparent from the following detailed description, when taken in conjunction with the accompanying drawings, in which:

FIGS. 10A to 10D are views illustrating the assembly process of detecting a tilt of a camera device and correcting an optical axis, according to an embodiment of the present disclosure.

Throughout the drawings, like reference numerals will be understood to refer to like parts, components and structures.

DETAILED DESCRIPTION

Figure 1:
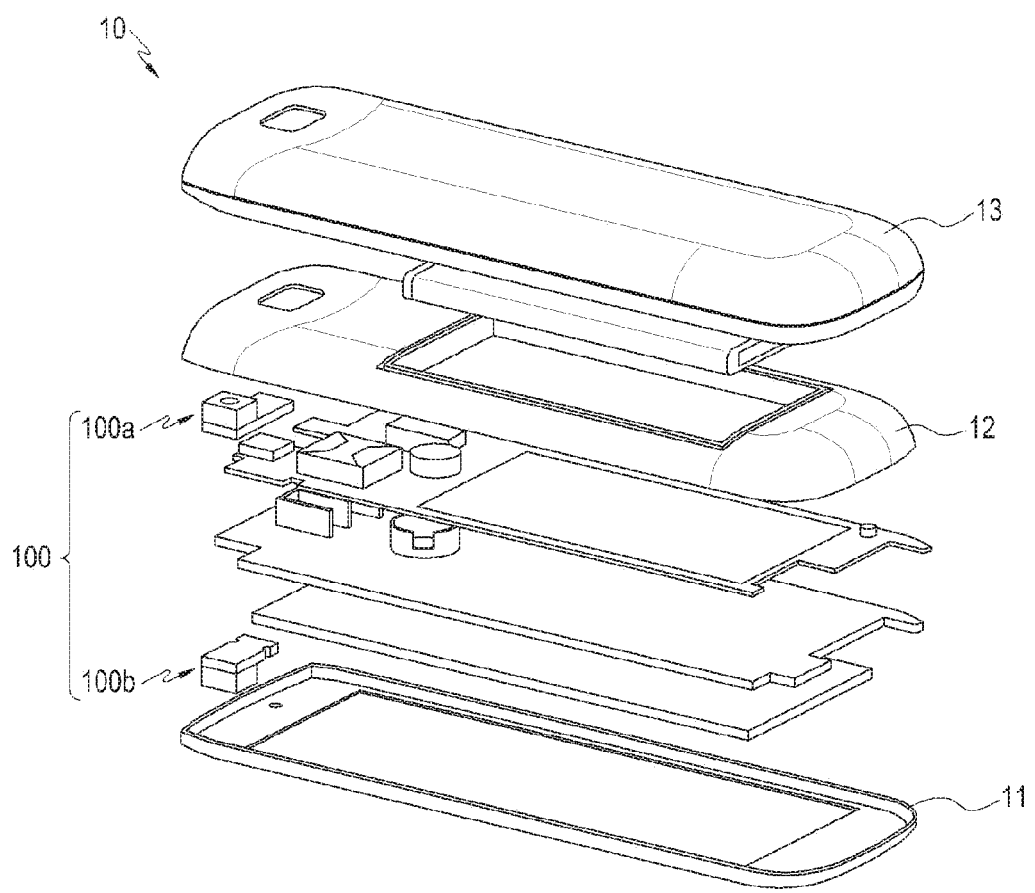
FIG. 1 is an exploded perspective view illustrating an electronic device having a camera device according to an embodiment of the present disclosure.

Various changes may be made to the present disclosure and the present disclosure may come with a variety of embodiments. Some embodiments of the present disclosure are shown and described in connection with the drawings. However, it should be appreciated that the present disclosure is not limited to the particular embodiments and all changes and/or equivalents or replacements thereto also belong to the scope of the present disclosure.

The terms used with ordinal numbers such as 'first' and 'second' may be used to describe various components, but the components are not limited by the terms. The terms are used only to distinguish one component from another. For example, a first component may be referred to as a second component, and vice versa, without departing from the scope of the present disclosure. The term "and/or" may denote a combination(s) of a plurality of related items as listed or any of the items.

The terms "front surface," "rear surface," "upper surface," and "lower surface" are relative terms that may vary depending on the directions in which the figures are viewed, and may be replaced with ordinal numbers such as "first" and "second." The order denoted by the ordinal numbers, first and second, may be varied as necessary.

The terms as used herein are provided merely to describe embodiments thereof, and not to limit the present disclosure. It is understood that the singular forms "a," "an," and "the" include plural references unless the context clearly dictates otherwise. It will be further understood that the terms "include" "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meanings as understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly defined herein.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a TV, a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the present disclosure, the electronic device may be a flexible device or a flexible display.

Further, the electronic device may be a wearable electronic device that may be worn on the user's body. The wearable electronic device may be provided to interwork with an electronic device, such as a smartphone, as described above.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

Figure 2:
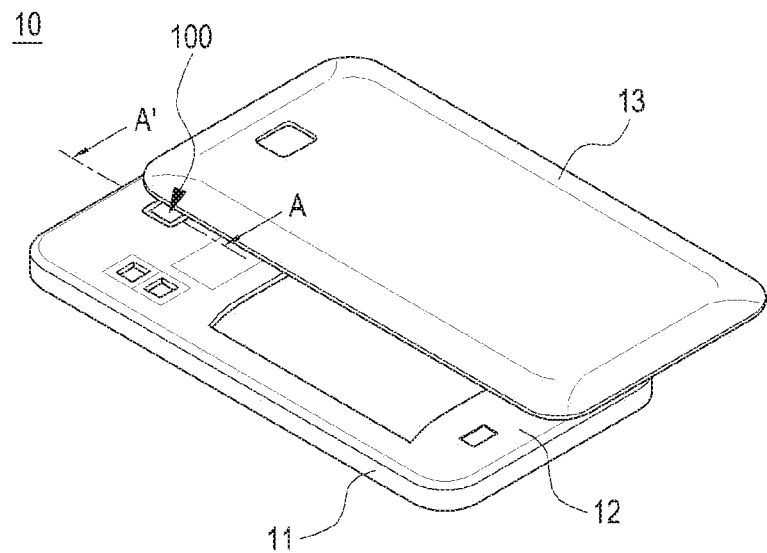
FIG. 2 is a perspective view illustrating the rear surface of an electronic device with a camera device according to an embodiment of the present disclosure.
Figure 3:
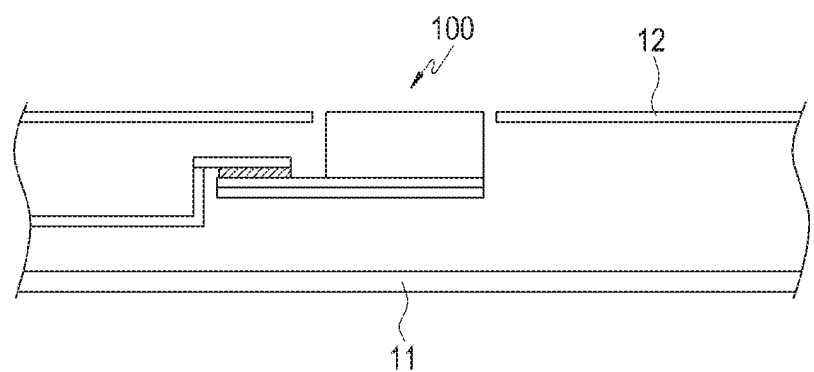
FIG. 3 is a cross-sectional view taken along line A-A' of FIG. 2.

FIG. 1 is an exploded perspective view illustrating an electronic device 10 having a camera device 100 according to an embodiment of the present disclosure. FIG. 2 is a perspective view illustrating the rear surface of an electronic device 10 with a camera device 100 according to an embodiment of the present disclosure. FIG. 3 is a cross-sectional view taken along line A-A' of FIG. 2.

Referring to FIGS. 1 to 3, according to an embodiment of the present disclosure, the electronic device 10 includes a first cover 11 forming a surface of the electronic device 10, a second cover 12 forming an opposite surface of the electronic device 10 when coupled with the first cover 11, a camera assembly (hereinafter, referred to as a camera device 100). The electronic device 10 further includes a battery cover 13 covering the second cover 12.

According to an embodiment of the present disclosure, an example in which the first cover 11 forms a front surface of the electronic device 10 and a display device for input and output is described. Further, described is an example in which the second cover 12 forms a rear surface of the electronic device 10 and forms a space for mounting a battery therein. However, the first cover 11 and the second cover 12 may be formed in an opposite manner and may have various shapes or structures according to the electronic device 10.

A supporting frame or various modules, such as a camera device 100 or an antenna device or a speaker device, may be provided in a space between the first cover 11 and the second cover 12, and a main circuit board may be provided to electrically connect them.

The camera device 100 is disposed at least partially in a space formed between the first cover 11 and the second cover 12. According to an embodiment of the present disclosure, the camera device 100 may be exposed towards the first cover 11 (the camera device denoted by 100a in FIG. 1) and may be exposed towards the second cover 12 (the camera device denoted by 100b in FIG. 1). Although described is an example in which the camera device 100 is exposed through the second cover 12, the camera device 100 may be mounted to be exposed towards the first cover 11.

Figure 4:
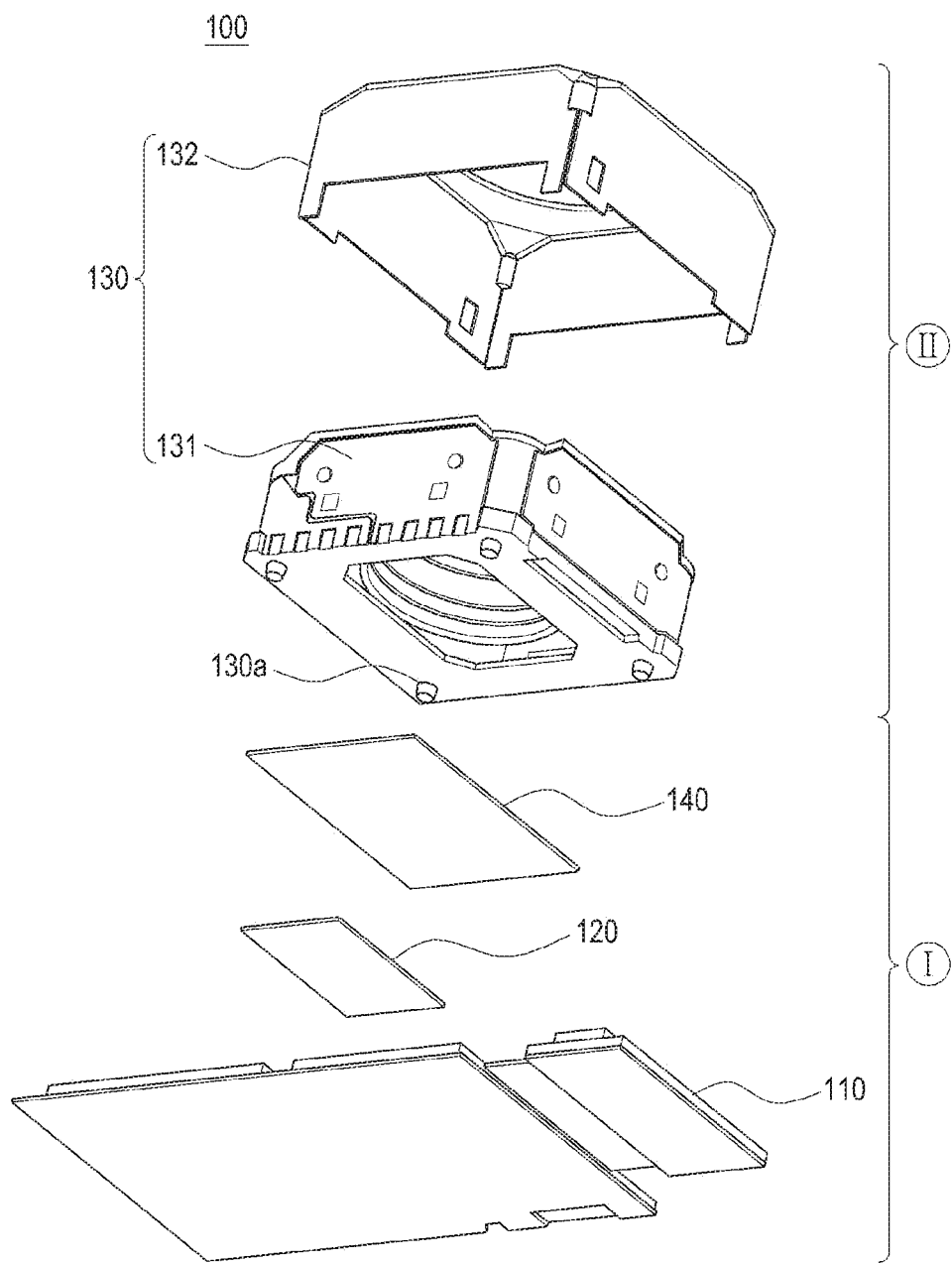
FIG. 4 is a perspective view illustrating a camera device according to an embodiment of the present disclosure.
Figure 5:
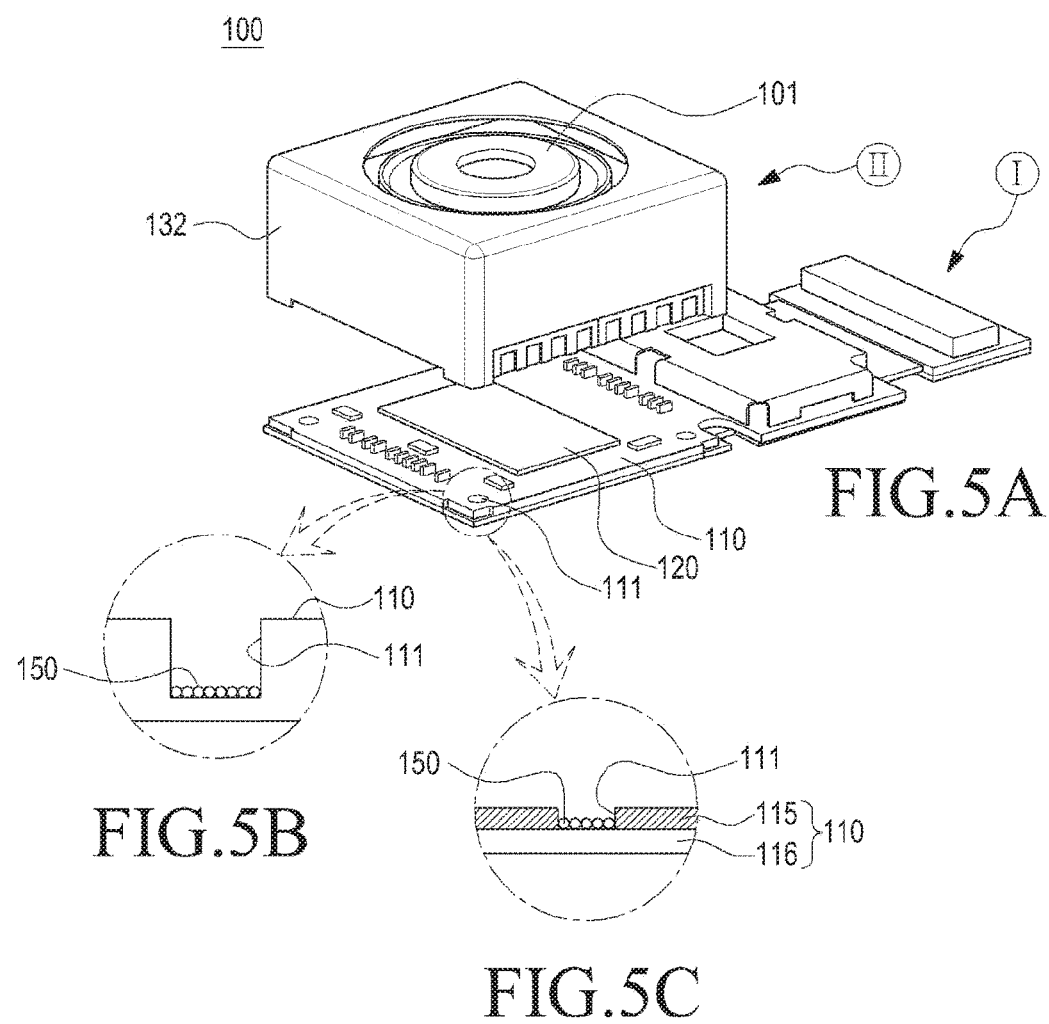
FIG. 5A is a perspective view illustrating a camera device as viewed from another direction, according to an embodiment of the present disclosure.
FIG. 5B and FIG. 5C are exploded views of solid bodies of a camera device according to an embodiment of the present disclosure.

FIG. 4 is a perspective view illustrating a camera device according to an embodiment of the present disclosure. FIG. 5A is a perspective view illustrating a camera device as viewed from another direction, according to an embodiment of the present disclosure. FIG. 5B and FIG. 5C are exploded views of solid bodies of a camera device according to an embodiment of the present disclosure;

Referring to FIGS. 4 and 5, according to an embodiment of the present disclosure, the camera device 100 includes a lower module (hereinafter, a first module I) and an upper module (hereinafter, a second module II) separately assembled from the first module I and mounted and fastened onto the first module I, and solid bodies 150 for aligning an optical axis of the first module I with an optical axis of the second module II The first module I includes a board 110 including a metal plate 116 and a printed circuit board 115 and an image sensor 120 mounted on the board 110.

The second module II is a component mounted on the top of the first module I and includes a lens assembly 101 having at least one or more lenses stacked one over another and a side wall 130 having the lens assembly 101 mounted therein and seated and fastened on top of the above described first module I, specifically, the board 110.

The solid bodies 150 are provided between the first module I and the second module II to allow the optical axis of the first module I to be aligned with the optical axis of the second module II by allowing the second module II to be seated at a different height from the first module I.

Referring to FIG. 11, as described below, a third module III having a separate lens assembly 102 from the lens assembly 101 is provided on the second module II, and the solid bodies 150 are provided to correct misalignment of the third module III with respect to the direction of the optical axis of the second module II (refer to FIG. 11).

According to an embodiment of the present disclosure, when the image sensor 120 is tilted on the board 110 to be assembled, with the optical axis direction of the first module I misaligned, the solid bodies 150 may allow the second module II to be seated at a different height from the first module I so that the optical axis of the second module II assembled on the first module I having the misaligned optical axis may be aligned along the optical axis direction of the first module I.

According to an embodiment of the present disclosure, the solid bodies 150, when the lens assembly 101 is tilted inside the side wall 130 and is assembled with the optical axis direction of the first module I misaligned, may allow the second module II to be seated at a different height from the first module I so that the optical axis of the second module II is aligned with the optical axis direction of the first module I.

Referring again to FIG. 11, according to an embodiment of the present disclosure, the solid bodies 150 may be provided to allow the third module III to be seated at a different height from the second module II so that the optical axis of the lens assembly 102 of the third module III is substantially aligned with the optical axis direction of the lens assembly 102 mounted in the second module II when the lens assembly 102 mounted in the third module III is assembled with an incline about the side wall during assembly.

According to an embodiment of the present disclosure, the solid bodies 150 correct a tilt that occurs when the several camera devices 100 are assembled. However, the tilt caused by assembly of the camera device 100 is not limited thereto. For example, the image sensor 120 may be mounted tilted on the board, and the lens assembly 101 may be mounted tilted inside the side wall 130 so that the optical axis of the camera device 100 is not aligned. In this case, the solid bodies 150 may have different heights from the bottom of the cuts 111 to allow the first module I and the second module II to be aligned in optical axis to each other.

The first module I includes the board 110 and the image sensor 120 mounted on the board 110.

The image sensor 120 may convert light reflected by an object to the image sensor 120 into an image signal and may be any one of a complementary metal-oxide semiconductor (CMOS) sensor or a charge coupled device (CCD) sensor.

According to an embodiment of the present disclosure, the image sensor 120 may be electrically connected to a surface of the board positioned under the image sensor 120 via a flip chip scheme or wire bonding scheme.

The board 110 may be electrically connected with the image sensor 120 and may digitize the image signal output from the image sensor 120. A connection circuit board extending from the printed circuit board 115 may be provided at a side of the board 110 and may be electrically connected with a main circuit board of the electronic device 10 where the camera device 100 is mounted.

On the board 110 may be at least one or more cuts 111 where protrusions 130a of the side wall 130 are seated or fitted, as shown in FIG. 5A.

The cuts 111 may include a first cut and a second cut adjacent and spaced apart from each other on the surface of the board 110. The second cuts are formed at two opposite sides of the first cut and along a diagonal direction of the first cut. That is, in this example, four cuts 111 are provided. The protrusions 130a seated in the cuts 111 as described below may include a first protrusion fitted in the first cut and a second protrusion fitted in the second cut and spaced apart from the first protrusion. According to an embodiment of the present disclosure, four cuts 111 and four protrusions 130a respectively fitted in the cuts 111 are provided.

Referring to FIGS. 5B and 5C, solid bodies 150 as described above may include first solid bodies put in between the first cut and the first protrusion and second solid bodies put in between the second cuts and the second protrusions, and the first solid bodies may be different in size from the second solid bodies. The number of solid bodies seated in the first cut (hereinafter, "a first number") and the number of solid bodies seated in the second cut (hereinafter, "a second number") may differ from each other.

When a plurality of cuts 111 are formed on the surface of the board 110, the solid bodies 150 may be provided in at least one cut 111 but not in the other cuts 111. Further, when the solid bodies 150 are provided in the plurality of cuts 111, the solid bodies respectively put in each cut 111 may be different in size from each other. For example, when four cuts 111 are formed in the surface of the board 110 according to an embodiment of the present disclosure, the solid bodies 150 may be provided in only one cut 111 of the four cuts 111 while no solid bodies may be in the three remaining cuts 111, or among the four cuts 111, two or three cuts 111 may have solid bodies 150 but the fourth cut 111 might not. Further, the solid bodies 150 may be put in all of the four cuts 111. Further, when three of the four cuts 111 have solid bodies 150, the solid bodies 150 in the three cuts 111 may have different sizes. Putting solid bodies 150 in at least some of the cuts 111 or making the solid bodies 150 different in size for each cut 111 may be determined depending on the degree of misalignment of the optical axis direction due to a tilt of the image sensor 120 on the board 110, the degree of misalignment from the optical axis direction due to a tilt of the electronic device 101 in the side wall 130, or a misalignment of the lens assembly 102 of the third module III as described below.

While the board 110 may be formed of a printed circuit board as shown in FIG. 5B, the board 110 may also be formed of the printed circuit board 115 and the metal plate 116 as shown in FIG. 5C.

When the board 110 includes the printed circuit board alone, the image sensor 120 may be mounted substantially at the center of the printed circuit board, and at least one or more cuts 111 may be provided around the image sensor 120. As the cuts 111 are formed inward from the surface of the printed circuit board 110, the solid bodies 150 may be distributed within the cuts 111.

When the board 110 is formed of the printed circuit board 115 and the metal plate 116, the metal plate 116 may be disposed substantially parallel with the first cover 11, so that a surface where the image sensor 120 and an end of the side wall 130 are mounted has a predetermined flatness. On a surface of the metal plate 116 may be mounted the printed circuit board 115 to support the printed circuit board 115. The metal plate 116 is formed of a metal to reinforce and support the printed circuit board 115 by securing a flatness. However, the metal plate 116 is not limited as formed of a metal and may be formed of any material that may reinforce and support the printed circuit board 115 with a predetermined flatness, such as a plastic plate or epoxy plate.

The printed circuit board 115 may be seated on top of the metal plate 116 and may have a cuts 111 formed substantially at the center of the printed circuit board 115 to mount the image sensor 120 on the surface of the metal plate 116. Further, the cuts 111 are offset to pass through the top and bottom of the printed circuit board 115. The protrusions 130a of the side wall 130 may pass through the cuts 111 and seat and fasten to the bottom surface of the cuts 111, i.e., the surface of the metal plate 116 exposed by the cuts 111. Further, in this case, solid bodies 150 used as height adjustment members may be distributed to have predetermined heights from the bottom surface of the cuts 111, i.e., the surface of the metal plate 116 inside the cuts 111.

Another embodiment of the present disclosure will now be described in which the board 110 is formed of the printed circuit board. However, as set forth above, the board 110 may be formed of the printed circuit board 115 and the metal plate 116 supporting the printed circuit board 115. Although the board 110 is constituted of a single layer of substrate, embodiments of the present disclosure are not limited thereto. For example, the board 110 may include multiple substrates stacked one over another, each including an insulation layer and an interconnection pad. Further, the board 110 used herein may be at least one of a ceramic board, a metal board, or a plastic board, and various components may be mounted on the board 110 to process image signals converted by the image sensor 120.

The second module II may include a side wall 130 and a lens assembly 101.

The side wall 130 may surround at least a portion of the image sensor 120 and the lens assembly 101, and according to an embodiment of the present disclosure, the side wall 130 has a quadrangular shape with open top and bottom. Further, four protrusions 130a are formed on the bottom of the side wall 130. However, the number of protrusions 130a may vary as long as they seat and fasten the side wall 130 onto the board 110.

The side wall 130 may include a first body 131 and a second body 132. The first body 131 may have therein at least one or more lens assemblies 101 and driving members as described above and allow light reflected by an object to be incident through the lens assembly 101 to the image sensor 120. The second body 132 may be provided on an outer surface of the first body 131 and may reinforce the rigidity of the first body 131.

According to an embodiment of the present disclosure, the first body 131 may be assembled by injection molding a material, such as plastic, and the second body 132 may be assembled by bi-injection molding a metal to the first body 131 or pressurizing the material to the first body 131.

For example, the protrusions 130a may be formed to protrude from an end of the side wall 130, specifically the bottom of the first body 131. However, the protrusions 130a may project from the second body 132 or protrude from both the first body 131 and the second body 132, or any other modifications or variations may be made thereto. As described above, the protrusions 130a may include a first protrusion and a second protrusion respectively fitted in the first cut and the second cut. According to an embodiment of the present disclosure, the second cuts are provided at a side of the first cut, an opposite side of the first cut, and a side neighboring and facing the first cut, and the protrusions 130a may include the first protrusion fitted in the first cut and the second protrusions formed at two opposite side surfaces of the first protrusion and a surface opposite the same. Described is an example in which the protrusions 130a are provided at edges where the neighboring side walls 130 meet. In other words, four side walls 130 are coupled with each other, and the protrusions 130a are provided at edges where the side walls 130 meet on lower surfaces of the side walls 130. However, various modifications or changes may be made to the number or position of the protrusions 130a without limitation as long as they may be formed on the bottom of the side walls to fasten the side walls onto the board.

The lens assembly 101 is formed by stacking at least one lens and may be disposed adjacent to the light-receiving surface of the image sensor 120. The lens assembly 101 may be received inside the side walls 130.

A driving member may be provided in the side walls 130 to drive the lens assembly 101 in the direction of the optical axis. The driving member may be formed of a voice coil motor (VCM), a piezo actuator, or a shape memory alloy to correct the misalignment of the lens assembly 101.

Figure 6:
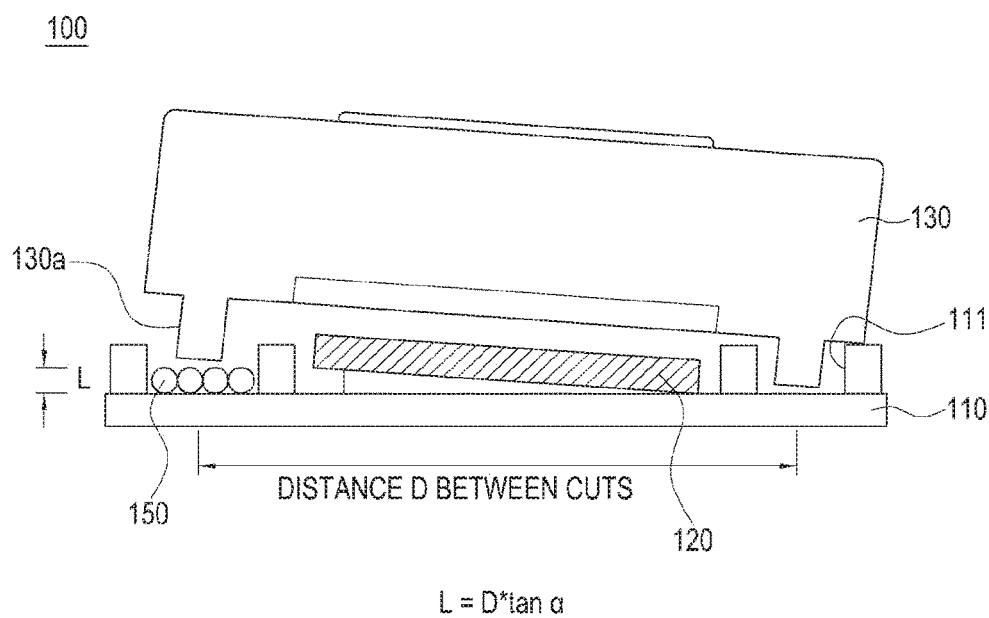
FIG. 6 is a view schematically illustrating correcting an optical axis by solid bodies of a camera device according to an embodiment of the present disclosure.
Figure 7:
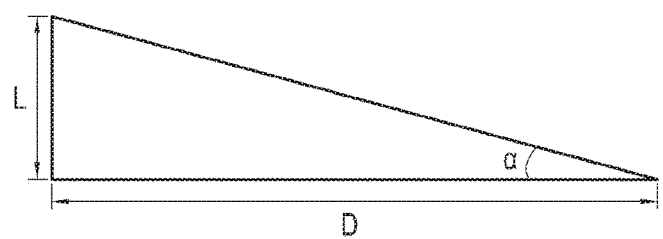
FIG. 7 is a view schematically illustrating detecting the size of solid bodies of a camera device according to an embodiment of the present disclosure.

FIG. 6 is a view schematically illustrating correcting an optical axis by solid bodies 150 of a camera device 100 according to an embodiment of the present disclosure. FIG. 7 is a view schematically illustrating detecting the size of solid bodies 150 of a camera device 100 according to an embodiment of the present disclosure.

Referring to FIGS. 6 and 7, the solid bodies 150 are disposed in the cuts 111 at predetermined heights between the cuts 111 and the protrusions 130a. The solid bodies 150 may cause the side walls 130 mounted on the board 110 to be at different heights when the second module II is assembled to the first module I so that the second module II is mounted inclined at a predetermined angle (refer to FIGS. 8 and 9). Further, the solid bodies 150 may cause the side walls of the third module III mounted on the second module II to be at different heights when the third module III is assembled to the second module II so that the third module III is mounted inclined at a predetermined angle (refer to FIGS. 11A and 11B).

The solid bodies 150 may include solid beads. According to an embodiment of the present disclosure, the solid bodies 150 are formed of micro metallic beads shaped as tiny balls. However, the shape of the solid bodies 150 is not limited thereto, and various changes may be made thereto. For example, the solid bodies 150 may have polygonal stereoscopic shapes. Various changes may be made to the material forming the protrusions as long as they have as much rigidity as required to support the protrusions 130a between the protrusions 130a and the cuts 111.

As described above, the solid bodies 150 may include first solid bodies and second solid bodies. The first solid bodies may be put in between the first cut and the first protrusion, and the second solid bodies may be put in between the second cuts and the second protrusions. Further, the first solid bodies may be different in size than the second solid bodies. The description of the solid bodies 150 has been given above and applies equally.

The solid bodies 150 may be seated inside the cuts 111 and may be formed at the same height in the cuts 111. According to an embodiment of the present disclosure, the solid bodies 150 may be distributed in a single layer inside the cuts 111. However, when the solid bodies 150 are formed of very tiny beads, the height at which they are distributed may be adjusted to remain the same from the bottom of the cuts 111 through the volume of the solid bodies 150 distributed in the cuts 111.

The size of the solid bodies 150 may be set according to: '$D=L*\tan\alpha$', where D is the distance between the cuts 111, L is the size of the solid bodies 150 and $\alpha$ is the angle formed between the board 110 and the image sensor 120. If the distance between the first cut and the second cut and the angle at which the image sensor 120 or the lens assembly 101 is misaligned with respect to the optical axis direction are given, the size of the solid bodies 150 may be set. In other words, when the image sensor 120 is mounted on the board 110, the angle at which the image sensor 120 has been tilted with respect to a direction perpendicular to the optical axis may be known. Further, since the distance between two neighboring cuts 111 is also set, the size of the solid bodies 150 may be set through the above equation.

The solid bodies 150 may be distributed in a single layer at the set height in the cuts or may be stacked on multiple layers in the cuts to implement the set height.

According to an embodiment of the present disclosure, the camera device 100 may further include a coupling member to join the first module I and the second module II together.

The coupling member may be provided to contact the bottom of an end of the side wall 130 between two neighboring cuts 111 to couple the side wall 130 to the board 110.

Described below is an assembly process for allowing the first module I and the second module II to be aligned along the same optical axis when the first module I is assembled tilted from the optical axis direction due to a tilt of the image sensor 120 on the board 110.

Figure 8:
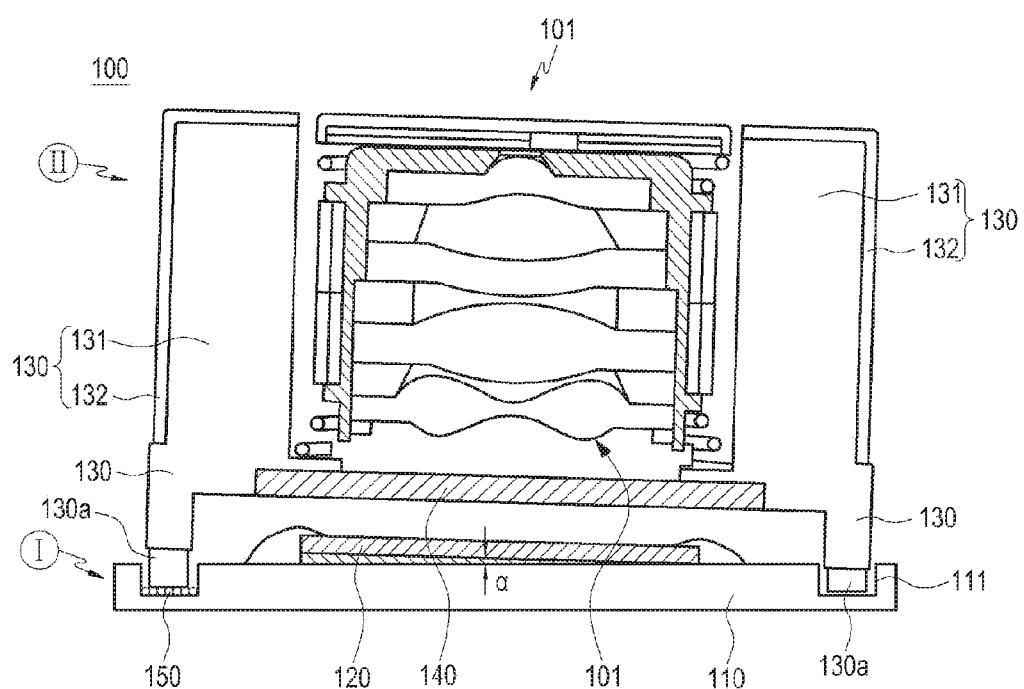
FIG. 8 is a cross-sectional view illustrating correcting a misaligned first module of a camera device according to an embodiment of the present disclosure.

FIG. 8 is a cross-sectional view illustrating correcting a misaligned first module I of a camera device 100 according to an embodiment of the present disclosure.

Referring to FIG. 8, the lens assembly 101 is mounted in the optical axis direction inside the side walls 130, assembling the second module II. The image sensor 120 is mounted on the top of the board 110, assembling the first module I.

When the image sensor 120 is mounted on the top of the board 110, the image sensor 120 may be misaligned with respect to the optical axis direction on the surface of the board 110 by a coupling agent which mounts the image sensor 120 on the board 110 and causes bends or unevenness on the surface of the board 110.

When the image sensor 120 is mounted misaligned on the surface of the board 110, the misaligned angle of the image sensor 120 of the first module I may be detected by detecting the tilt of the optical axis of the image sensor 120.

The degree of tilt of the side wall to allow the lens assembly 101 to have the same optical axis as the image sensor 120, specifically, the degree by which a side of the side wall 130 has been misaligned with respect to the other side of the side wall 130, may be detected through the detected angle of tilt and the distance between two neighboring cuts 111 on the board 110. Solid bodies 150 may be provided between the cuts 111 and the protrusions 130a to modify the height by which the side of the side wall 130 is misaligned with respect to the other side thereof.

When the solid bodies 150 having a preset height are put in the cuts 111 that need to have different heights, the solid bodies 150 may be distributed in a single layer on the bottom of the cuts 111 at the preset height inside the cuts 111. Thus, the cut 111 in which the solid bodies 150 are placed may have a different height from the cut 111 in which no solid bodies 150 are placed.

When the second module II is seated on the first module I, the protrusions 130a may be fitted in their respective cuts 111. The side of the side wall 130 on the side of the protrusion 130a seated in the cut 111 having solid bodies 150 may be positioned higher than the other side of the side wall 130 on the side of the protrusion 130a seated on the cut 111 having no solid bodies 150, so that the overall side wall 130 may be tilted in a direction so that the optical axis direction of the image sensor 120 is aligned to the optical axis direction of the lens assembly 101.

Described below is an assembly process for allowing the first module I and the second module II to be aligned along the same optical axis when the first module I is assembled tilted from the optical axis direction due to a tilt of the lens assembly 101 inside the side wall 130.

Figure 9:
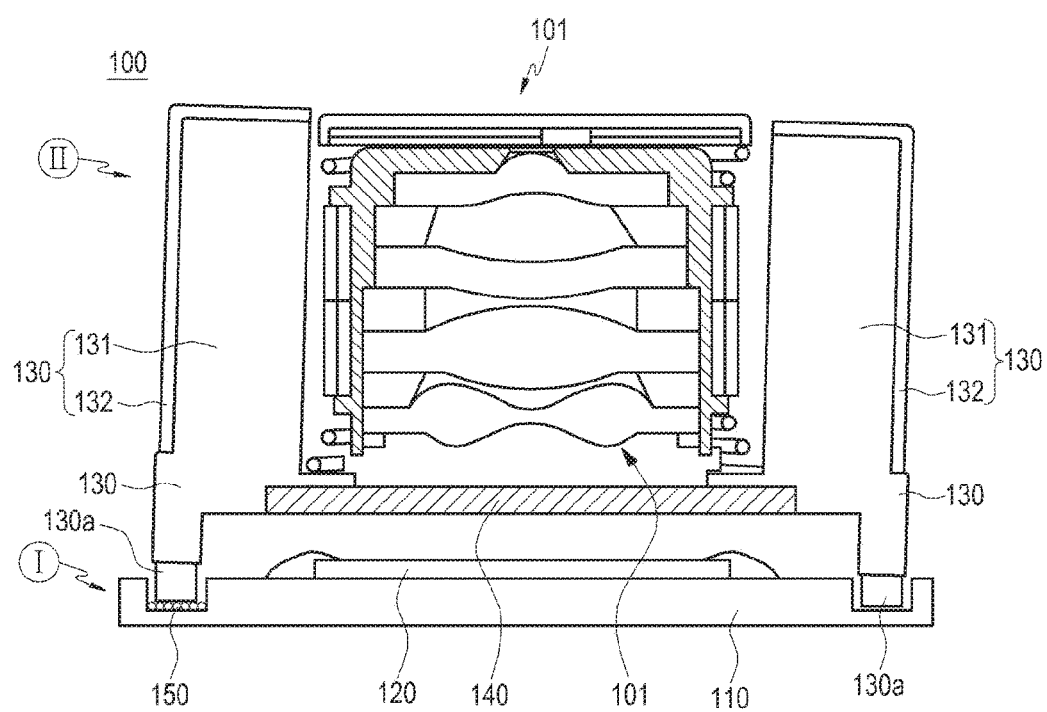
FIG. 9 is a cross-sectional view illustrating correcting a misaligned second module of a camera device according to an embodiment of the present disclosure.

FIG. 9 is a cross-sectional view illustrating correcting a misaligned second module II of a camera device 100 according to an embodiment of the present disclosure.

Referring to FIG. 9, the image sensor 120 is mounted along the optical axis direction on the top of the board 110, assembling the first module I. The lens assembly 101 is mounted inside the side wall 130, assembling the second module II.

The first module I, specifically the image sensor 120, may be mounted to be aligned with the optical axis direction on the top surface of the board 110. By contrast, when the lens assembly 101 is mounted on the side wall 130, the lens assembly 101 may be fastened and misaligned with the optical axis direction of the side wall 130.

When the lens assembly 101 is mounted misaligned on the inside surface of the side wall, the misaligned angle of the image sensor 120 of the first module I may be detected by detecting the tilt of the optical axis of the second module II. That is, the degree of tilt of the side wall 130, specifically the degree by which the lens assembly 101 has been misaligned inside the side wall 101, may be detected depending on the tilted angle in which the optical axis of the lens assembly 101 is aligned to the optical axis of the image sensor 120. Accordingly, as the lens assembly 101 is aligned with the image sensor 120 for the optical axis direction, the degree by which the side wall 130 is misaligned on the board 110 may be detected. Solid bodies 150 may be provided between the cuts 111 and the protrusions 130a to modify the height by which the side of the side wall 130 is misaligned with respect to the other side thereof.

When the solid bodies 150 having a preset height are placed in the cuts 111 that need to have different heights, the solid bodies 150 may be distributed in a single layer on the bottom of the cuts 111 at the preset height inside the cuts 111. Thus, the cut 111 in which the solid bodies 150 are placed may have a different height from the cut 111 in which no solid bodies 150 are placed.

When the second module II is seated on the first module I, the protrusions 130a may be fitted in their respective cuts 111. The side of the side wall 130 on the side of the protrusion 130a seated in the cut 111 having solid bodies 150 may be positioned higher than the other side of the side wall 130 on the side of the protrusion 130a seated in the cut 111 having no solid bodies 150, so that the overall side wall 130 may be tilted in a direction so that the optical axis direction of the image sensor 120 is aligned to the optical axis direction of the lens assembly 101.

As described above, when the first module, specifically the image sensor, is mounted misaligned on the board or when the second module, specifically the lens assembly, is mounted misaligned on the side wall, the image sensor and the lens assembly may be aligned in their optical axis by causing the side wall to be misaligned at a predetermined angle on the board through the solid bodies 150.

FIGS. 10A to 10D are views illustrating the assembly process of detecting a tilt of a camera device 100 and correcting an optical axis according to an embodiment of the present disclosure.

Referring to FIG. 10A, the degree by which the image sensor 120 is misaligned with respect to the optical axis direction may be detected while turning the first module I up, down, left, or right, and the degree by which the lens assembly 101 is misaligned with respect to the optical axis direction may be detected while turning the second module II up, down, left, or right.

A difference between the height at which one side of the side wall 130 is mounted and the height at which the other side of the side wall 130 is mounted may be detected when the side wall 130 is mounted on the top of the board 110 through a detected value at which the image sensor 120 is tilted with respect to the optical axis direction or a detected value at which the lens assembly 101 is tilted with respect to the optical axis direction. The height of the solid bodies 150 may be set through a corrected tilt value as detected. The solid bodies 150 having the set size are placed in the cut 111 whose height needs to be corrected. Referring to FIG. 10B, the solid bodies are placed when a micro bead is applied. Accordingly, the cuts 111 have different fit-in depths.

Referring to FIG. 10C, a coupling agent, specifically epoxy, may be is applied on the surface of the board 110 between the cuts 111 to attach the bottom of an end of the side wall 130 thereto (c).

When the side wall 130 is attached onto the top of the board 110 so that the protrusions 130a are fitted in their respective cuts 111, the protrusion 130a fitted in the cut 111 having solid bodies 150 may be seated at a lower level as compared with the protrusion 130a fitted in the cut 111 having no solid bodies 150. Accordingly, one side of the side wall 130 may be projected further than the other side of the side wall 130, so that the side wall 130 may be mounted tilted on the board 110. Although the side wall 130 is mounted tilted on the board 110, the image sensor 120 and the lens assembly 101 may have the optical axis corrected and aligned. FIG. 10D refers to the completed housing attach process.

As described above, according to an embodiment of the present disclosure, in the camera device and the electronic device having the same, a tilt of the image sensor with respect to the optical axis direction or a tilt of the lens assembly seated on the side wall with respect to the optical axis direction that may occur during assembly of the camera device may be corrected, allowing the image sensor and the lens assembly to be substantially aligned with the optical axis direction while assembling the camera device. Thus, the camera device may have an aligned optical axis upon assembling the first module and the second module of the camera device.

Further, the IR filter may be provided to cover the image sensor while supported by the bracket, and thus, foreign bodies may be prevented from being introduced into the image sensor while assembling the second module onto the assembled first module.

Described below are a camera device 100 and an electronic device 10 having the same according to a second embodiment of the present disclosure.

Figure 11A:
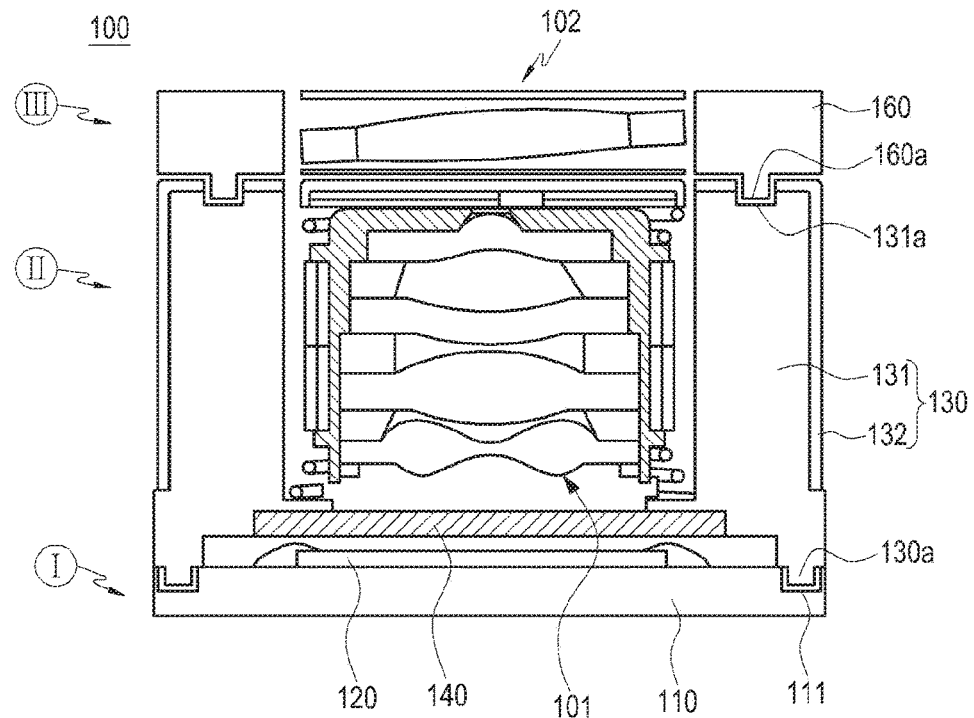
FIGS. 11A and 11B are cross-sectional views illustrating a camera device and correcting a tilt of the same, according to an embodiment of the present disclosure.
Figure 11B:
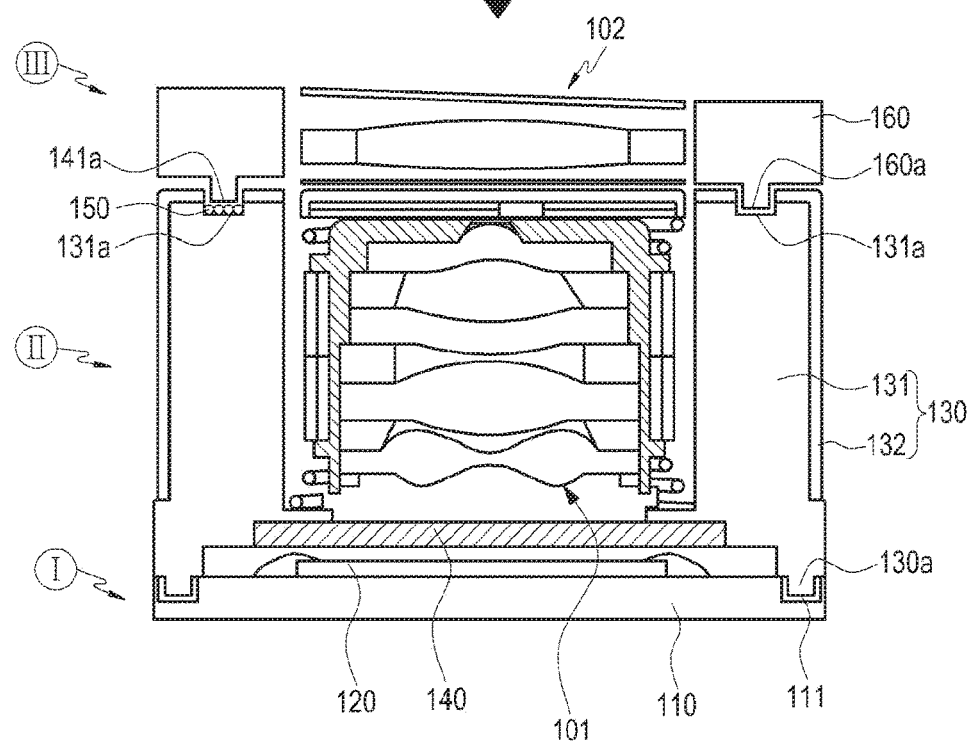

FIGS. 11A and 11B are cross-sectional views illustrating a camera device 100 and an example of correcting the same, according to an embodiment of the present disclosure.

Referring to FIG. 11A, according to the second embodiment of the present disclosure, the camera device 100 and the electronic device 10 having the same, are similar to the camera device 100 and the electronic device 10 according to the first embodiment of the present disclosure except for the stacked structure of the camera device 100. The description of the configuration or structure of the camera device 100 and the electronic device 10 according to the first embodiment may apply to the camera device 100 and the electronic device 10 according to the second embodiment of the present disclosure. Hereinafter, differences from the camera device 100 and the electronic device 10 according to the first embodiment are specifically described.

According to the second embodiment of the present disclosure, the camera device 100 is mounted in the electronic device 10 as shown in FIGS. 1, 2, and 3.

According to the second embodiment of the present disclosure, the camera device 100 may include the first module I and the second module II described above and may further include the third module III on the second module II.

According to the second embodiment of the present disclosure, the first module I of the camera device 100 may include the board 110 and the image sensor 120 as in the first embodiment. Thus, the description regarding the first embodiment may apply to the structure or configuration of the first module I.

Further, according to the second embodiment of the present disclosure, the second module II of the camera device 100 may include the side wall 130 and the lens assembly 101 as in the above embodiment. However, since the third module III is configured with the side wall 160 and the lens assembly 102, the side wall 130 of the second module II may be hereinafter denoted as a first side wall 130 and the lens assembly 101 may be denoted as a first lens assembly 101 for differentiation. The description regarding the first embodiment may apply to the configuration or structure of the second module II according to the second embodiment of the present disclosure.

According to the second embodiment of the present disclosure, the first module I and the second module II, specifically the image sensor 120 and the first lens assembly 101, are assembled stacked to have substantially aligned optical axis.

While the first module I and the second module II are stacked one over the other, aligned along the same optical axis, the third module III may be mounted overlaid on the top of the second module II. That is, the third module III may be stacked and fastened onto the top surface of the second module II.

At least one or more cuts 131a where protrusions 160a of the third module III as described below may be seated may be provided in the second module II, specifically along an edge of the top surface of the first side wall 130.

The cuts 131a may include a first cut and a second cut adjacent and spaced apart from each other on the top surface of the second side wall 160. According to the second embodiment of the present disclosure, described is an example in which second cuts are formed along two opposite sides and a diagonal direction of the first cut. That is, four cuts 131a are provided in the top surface of the second side wall 160. The protrusions 160a seated on the cuts 131a as described below may include a first protrusion fitted in the first cut and a second protrusion fitted in the second cut and spaced apart from the first protrusion. Four cuts 131a and four protrusions 160a respectively fitted in the cuts 131a are provided.

Solid bodies 150 as described above may include first solid bodies put in between the first cut and the first protrusion and second solid bodies put in between the second cuts and the second protrusions, and the first solid bodies may be different in size from the second solid bodies. The number of solid bodies seated in the first cut (hereinafter, "a first number") and the number of solid bodies seated in the second cut (hereinafter, "a second number") may differ from each other.

When the plurality of cuts 131a are formed in the top surface of the first side wall 110, the solid bodies 150 may be provided in at least one cut 131a but not in the other cuts 131a. Further, when the solid bodies 150 are provided in the plurality of cuts 131a, the solid bodies respectively put in each cut 131a may be different in size from each other. For example, when four cuts 131a are formed in the top surface of the first side wall 130 according to an embodiment of the present disclosure, the solid bodies 150 may be provided in only one cut 131a of the four cuts 131a while no solid bodies may be in the three remaining cuts 131a, or among the four cuts 131a, two or three cuts 131a may have solid bodies 150 but the other cut 131a might not. Further, the solid bodies 150 may be put in all of the four cuts 131a. Further, when three of the four cuts 131a have solid bodies 150, the solid bodies 150 in the three cuts 131a may have different sizes. Putting the solid bodies 150 in at least some of the cuts 131a or forming the solid bodies 150 in the cuts 131a in different sizes may be varied depending on a degree of misalignment due to a tilt of the second lens assembly 102 of the third module III with respect to the optical axis direction of the first lens assembly 101 and the image sensor 120.

According to the second embodiment of the present disclosure, the size of solid bodies 150 may be set according to: 'D=L*tan α', where D is the distance between the cuts 111, L is the size of the solid bodies 150 and α is the angle formed between the board 110 and the image sensor 120. The angle at which the second lens assembly 102 has been tilted with respect to the side wall or the optical axis may be known using an optical axis tilt detector while the second lens assembly 102 is mounted inside the second side wall 160.

Further, since the cut 131a formed in the top surface of the first side wall 130 and its neighboring cut 131a is set, the size of the solid bodies 150 may be set by putting in the equation the distance between the neighboring cuts 131a formed in the surface of the second side wall 160 and the tilted angle of the second lens assembly 102 obtained through the optical axis tilt detector.

The solid bodies 150 may increase the height of the bottom of the cuts 131a as large as the set height inside the cuts 131a, and thus, the protrusions 160a fitted in the cuts 131a may have as large a height as the solid bodies 150. Thus, the second side wall 160 having the protrusion 160a fitted in the cut 131a where the solid bodies 150 are distributed may be seated higher on the first side wall 130 as compared with the second side wall 160.

The third module III may include the second side wall 160 and the second lens assembly 102.

The second side wall 160 may be provided to surround at least a portion of the image sensor 120 and the lens assembly 101, and according to an embodiment of the present disclosure, the second side wall 160 has a quadrangular shape with open top and bottom. Further, four protrusions 160a are formed on the bottom of the second side wall 160. However, the number of protrusions 160a may be varied as long as they may seat and fasten the second side wall 160 onto the first side wall 130.

The second side wall 160 has at least one or more second lens assemblies 102 therein and allows light reflected by an object to be received by the first lens assembly 101 and the image sensor 120 via the second lens assemblies 102.

The protrusions 160a are formed on the bottom of the second side wall 160 at positions corresponding to the cuts 131a.

The protrusions 160a may include a first protrusion and a second protrusion respectively fitted in the first cut and the second cut. According to an embodiment of the present disclosure, the second cuts are provided at a side of the first cut, an opposite side of the first cut, and a side neighboring and facing the first cut, and the protrusions 160a may include the first protrusion fitted in the first cut and the second protrusions formed at two opposite side surfaces of the first protrusion and a surface opposite the same. According to the second embodiment of the present disclosure, the protrusions 160a are provided at edges where the neighboring second side walls 160 meet. In other words, according to an embodiment of the present disclosure, four second side walls 160 are coupled with each other, and the protrusions 160a are provided at edges where the second side walls 160 meet on lower surfaces of the second side walls 160. However, various modifications or changes may be made to the number or position of the protrusions 160a without limitation as long as they may be formed on the bottom of the second side walls 160 to fasten the second side walls 160 onto the first side wall 130.

The second lens assembly 102 is formed by stacking at least one lens and may be disposed adjacent to the light-receiving surface of the first lens assembly 101. The second lens assembly 102 may be disposed inside the second side walls 160.

The third module III may be assembled while the first module I and the second module II are assembled to have substantially aligned optical axis as described above. As the third module III, specifically the second lens assembly 102, is fastened misaligned at a predetermined angle inside the second side wall 160, if the second module II is stacked, the first and second modules I and II may have misaligned optical axes.

When the solid bodies 150 having a preset height are put in the cuts 131a that need to have different heights, the solid bodies 150 may be distributed in a single layer on the bottom of the cuts 131a at the preset height inside the cuts 131a. Thus, the cut 131a in which the solid bodies 150 are placed may have a different height from the cut 131a in which no solid bodies 150 are placed.

When the third module III is seated on the second module II, the protrusions 160a may be fitted in their respective cuts 131a. As such, as the second side wall 160 on the side of the protrusion 160a fitted in the cut 131a having the solid bodies 150 is different in height than the second side wall 160 on the side of the protrusion 160a fitted in the cut 131a having no solid bodies 150 or having solid bodies 150 with a different size, the overall side wall 130 may be mounted on the top of the first side wall 130, inclined in a direction determined by the height of the solid bodies.

Although the second side wall 160 is stacked inclined on the first side wall 130, the second lens assembly 102 may be corrected to be substantially aligned with the first lens assembly 101 and the image sensor 120.

As described above, although the third module III, specifically the second lens assembly 102, is assembled misaligned inside the second side wall 160, the second side wall 160 may be joined to be inclined at an angle that should be corrected with respect to the first side wall 130, and thus, the optical axis of the second lens assembly 102 may aligned to the optical axis of the first lens assembly 101 or the image sensor 120.

According to an embodiment of the present disclosure, the camera device and the electronic device having the same has an image sensor stacked tilted on the board. The lens assembly of the camera device may be corrected to be aligned with the optical axis of the image sensor, so that even when the lower module tilts, the lower module and the upper module may be aligned. Thus, the camera device may have good quality.

According to an embodiment of the present disclosure, when the side wall of the camera device is fastened onto an upper portion of the image sensor, they may be assembled with the optical axis aligned, thereby leading to increased production yield, work process efficiency, and reliability against tilts while processing the camera device.

According to an embodiment of the present disclosure, the third module of a camera device in an electronic device having the second lens assembly whose optical axis has been misaligned is mounted on the second module, the third module may be seated inclined from the second module to correct the misaligned optical axis of the third module. Thus, the third module may have an optical axis aligned with those of the first and second modules.

While the present disclosure has been shown and described with reference to embodiments thereof, it will be apparent to those of ordinary skill in the art that various changes in form and detail may be made thereto without departing from the spirit and scope of the present disclosure. It should be understood that in addition to the embodiments disclosed herein, all modifications and changes or modified and changed forms derived from the technical idea of the present disclosure fall within the scope of the present disclosure. Therefore, the scope of the present disclosure should not be defined as being limited to the embodiments, but should be defined by the appended claims and their equivalents.

What is claimed is:

1. An electronic device, comprising:
   a first cover forming a first surface of the electronic device;
   a second cover forming a second surface of the electronic device, the second surface being positioned opposite the first surface; and
   a camera assembly at least partially disposed in a space between the first cover and the second cover, wherein the camera assembly includes an image sensor, a board having the image sensor mounted thereon and including at least one cut on a top surface of the board around the image sensor, a lens assembly disposed adjacent to a light-receiving surface of the image sensor, a side wall surrounding at least a portion of the lens assembly and having a protrusion protruded from a bottom surface of the side wall and fitted in the at least one cut, and at least one solid body provided between at least a portion of an inner surface of the at least one cut and the protrusion,
   wherein the at least one solid body includes a plurality of solid micro beads.

2. The electronic device of claim 1, wherein the at least one cut includes a first cut and a second cut spaced apart from the first cut, and wherein the protrusion includes a first protrusion fitted in the first cut and a second protrusion fitted in the second cut.

3. The electronic device of claim 2, wherein the at least one solid body includes a first solid body provided between at least a portion of an inner surface of the first cut and the first protrusion and a second solid body provided between at least a portion of an inner surface of the second cut and the second protrusion, wherein the first solid body is different in size from the second solid body.

4. The electronic device of claim 2, further comprising a first number of first solid bodies provided between at least a portion of an inner surface of the first cut and the first protrusion and
   a second number of second solid bodies provided between at least a portion of an inner surface of the second cut and the second protrusion, wherein the first number is different from the second number.

5. The electronic device of claim 2, wherein the size of the at least one solid body is set according to $D=L*\tan\alpha$,
   wherein D is the size of the at least one solid body, L is the distance between the first cut and the second cut, and $\alpha$ is an angle at which the image sensor or the lens assembly is tilted with respect to the board.

6. The electronic device of claim 1, wherein the at least one solid body is distributed in a single layer on a bottom surface of the at least one cut.

7. The electronic device of claim 1, wherein the board includes a printed circuit board, wherein the at least one cut is formed inwards from a surface of the printed circuit board, and wherein the at least one solid body is distributed at the same height on a bottom surface of the cut.

8. The electronic device of claim 1, wherein the board includes a metal plate disposed substantially parallel with the first cover, a printed circuit board disposed between the first cover and the metal plate and including a sensor mounting opening formed substantially in the center thereof and having the image sensor seated therein, and the at least one cut is disposed outside the sensor mounting opening.

9. The electronic device of claim 8, wherein the at least one cut is offset to a surface of the metal plate, and wherein the at least one solid body is distributed at a predetermined height on the surface of the metal plate inside the cut.

10. The electronic device of claim 1, wherein the image sensor is mounted to be tilted on the board, wherein the at least one solid body is provided in the at least one cut, the at least one solid body having a size set depending on a tilted angle of the image sensor, and wherein, when the protrusion is fitted in the at least one cut, at least a portion of the side wall is mounted to be tilted on the board so that the image sensor optical axis and the lens assembly optical axis are substantially aligned.

11. An electronic device, comprising:
    a first cover forming a surface of the electronic device;
    a second cover forming a second surface of the electronic device, the second surface being positioned opposite the first surface; and
    a camera assembly at least partially disposed in a space between the first cover and the second cover, wherein the camera assembly includes an image sensor, a board where the image sensor is mounted, a first lens assembly disposed adjacent to a light-receiving surface of the image sensor, a first side wall surrounding at least a portion of the first lens assembly and including at least one cut in a top surface thereof, a second lens assembly disposed adjacent to a light-receiving surface of the first lens assembly, a second side wall surrounding at least a portion of the second lens assembly and having a protrusion fitted in the at least one cut, and at least one solid body provided between at least a portion of an inner surface of the at least one cut and the protrusion.

12. The electronic device of claim 11, wherein the second lens assembly is tilted on the second side wall and is mounted to be misaligned with respect to an optical axis, and when the protrusion is fitted in the cut, at least a portion of the second side wall is mounted to be tilted on the first side wall, so that the second lens assembly has an optical axis substantially aligned to an optical axis of the first lens assembly.

13. The electronic device of claim 12, wherein the at least one cut includes a first cut and a second cut spaced apart from the first cut, and wherein the protrusion includes a first protrusion fitted in the first cut and a second protrusion fitted in the second cut.

14. The electronic device of claim 13, wherein the at least one solid body includes a first solid body provided between at least a portion of an inner surface of the first cut and the first protrusion and a second solid body provided between at least a portion of an inner surface of the second cut and the second protrusion, wherein the first solid body is different in size from the second solid body.

15. The electronic device of claim 13, further comprising a first number of first solid bodies provided between at least a portion of an inner surface of the first cut and the first protrusion and a second number of second solid bodies provided between at least a portion of an inner surface of the second cut and the second protrusion, wherein the first number is different from the second number.

16. The electronic device of claim 13, wherein the size of the at least one solid body is set according to $D=L*\tan\alpha$,
wherein D is the size of the at least one solid body, L is the distance between the first cut and the second cut, and $\alpha$ is a tilted angle of the second lens assembly.

17. A camera device, comprising:
a board having an image sensor mounted thereon and including at least one cut on a top surface of the board around the image sensor;
a side wall mounted on the board, having a lens assembly mounted thereon, and including a protrusion protruded from a bottom surface of the side wall and fitted in the at least one cut, the lens assembly disposed adjacent to a light-receiving surface of the image sensor; and
at least one solid body provided between at least a portion of an inner surface of the at least one cut and the protrusion, wherein the at least one solid body includes solid bodies allowing the side wall mounted around the lens assembly to have different heights,
wherein the at least one solid body includes a plurality of solid micro beads.

18. The camera device of claim 17, wherein the at least one cut includes a first cut and a second cut spaced apart from the first cut, and wherein the protrusion includes a first protrusion fitted in the first cut and a second protrusion fitted in the second cut.

19. The camera device of claim 18, wherein the at least one solid body includes a first solid body provided between at least a portion of an inner surface of the first cut and the first protrusion and a second solid body provided between at least a portion of an inner surface of the second cut and the second protrusion, wherein the first solid body is different in size from the second solid body.

20. The camera device of claim 18, further comprising a first number of first solid bodies provided between at least a portion of an inner surface of the first cut and the first protrusion and a second number of second solid bodies provided between at least a portion of an inner surface of the second cut and the second protrusion, wherein the first number is different from the second number.

21. The camera device of claim 18, wherein the size of the at least one solid body is set according to $D=L*\tan\alpha$,
wherein D is the size of the at least one solid body, L is the distance between the first cut and the second cut, and $\alpha$ is an angle at which the image sensor or the lens assembly is tilted.

22. The camera device of claim 17, wherein the board includes a printed circuit board, wherein the at least one cut is formed inwards from a surface of the printed circuit board, and wherein the at least one solid body is distributed at the same height on a bottom surface of the at least one cut.

23. The camera device of claim 17, wherein the board includes a metal plate disposed substantially parallel with a first cover and a printed circuit board disposed between the first cover and the metal plate, including a sensor mounting opening formed substantially in the center thereof and having the image sensor seated therein, and the at least one cut disposed outside the sensor mounting opening.

24. The camera device of claim 23, wherein the at least one cut is offset to a surface of the metal plate, and wherein the at least one solid body is distributed at the same height on the surface of the metal plate inside the at least one cut.

25. The camera device of claim 17, wherein the image sensor is mounted to be tilted on the board, wherein the at least one solid body is provided in the at least one cut, the at least one solid body having a size set depending on a tilted angle of the image sensor, and wherein when the protrusion is fitted in the at least one cut, at least a portion of the side wall is mounted to be tilted on the board so that the image sensor optical axis and the lens assembly optical axis are substantially aligned.

26. A camera device, comprising:
a board having an image sensor mounted thereon and including at least one cut around the image sensor;
a first side wall mounted on the board, having a first lens assembly mounted thereon, and including at least one cut formed in a top surface thereof, the first lens assembly disposed adjacent to a light-receiving surface of the image sensor;
a second lens assembly disposed adjacent to a light-receiving surface of the first lens assembly;
a second side wall surrounding at least a portion of the second lens assembly and having a protrusion fitted in the at least one cut; and
at least one solid body provided between at least a portion of an inner surface of the at least one cut and the protrusion.

27. The camera device of claim 26, wherein the second lens assembly is tilted on the second side wall and is mounted to be misaligned with respect to an optical axis, and when the protrusion is fitted in the at least one cut, at least a portion of the second side wall is mounted to be tilted on the first side wall, so that the second lens assembly has an optical axis substantially aligned to an optical axis of the first lens assembly.

28. The camera device of claim 27, wherein the at least one cut includes a first cut and a second cut spaced apart from the first cut, and wherein the protrusion includes a first protrusion fitted in the first cut and a second protrusion fitted in the second cut.

29. The camera device of claim 28, wherein the solid body includes a first solid body provided between at least a portion of an inner surface of the first cut and the first protrusion and a second solid body provided between at least a portion of an inner surface of the second cut and the second protrusion, wherein the first solid body is different in size from the second solid body.

30. The camera device of claim 28, further comprising a first number of first solid bodies provided between at least a portion of an inner surface of the first cut and the first protrusion and a second number of second solid bodies provided between at least a portion of an inner surface of the second cut and the second protrusion, wherein the first number is different from the second number.

31. The camera device of claim 28, wherein the size of the at least one solid body is set according to $D=L*\tan\alpha$, wherein D is the size of the solid body, L is the distance between the first cut and the second cut, and $\alpha$ is a tilted angle of the second lens assembly.

* * * * *